United States Patent
Matsumoto et al.

(10) Patent No.: US 8,336,834 B2
(45) Date of Patent: Dec. 25, 2012

(54) ELECTRICAL WIRE FIXING MEMBER

(75) Inventors: Mitsuhiro Matsumoto, Makinohara (JP); Hajime Katou, Makinohara (JP); Takashi Tsukamoto, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/000,584

(22) PCT Filed: Jun. 19, 2009

(86) PCT No.: PCT/JP2009/061671
§ 371 (c)(1),
(2), (4) Date: Dec. 21, 2010

(87) PCT Pub. No.: WO2010/013563
PCT Pub. Date: Feb. 4, 2010

(65) Prior Publication Data
US 2011/0108680 A1    May 12, 2011

(30) Foreign Application Priority Data
Jul. 28, 2008  (JP) ................. 2008-193559

(51) Int. Cl.
*F16L 3/08*   (2006.01)

(52) U.S. Cl. ..... 248/74.1; 248/74.3; 248/62; 248/316.1; 24/20 R

(58) Field of Classification Search ................. 248/74.1, 248/74.2, 74.3, 68.1, 62, 63, 230.1, 231.81, 248/316.7, 221.11, 222.11, 316.1; 24/20 R, 24/20 S, 20 CW, 22, 23 R, 23 W; 74/164
See application file for complete search history.

(56) References Cited

U.S. PATENT DOCUMENTS

| | | | | |
|---|---|---|---|---|
| 4,305,179 A | * | 12/1981 | Sakurada | 24/20 R |
| 4,713,863 A | * | 12/1987 | Jennings | 24/20 R |
| 4,742,600 A | * | 5/1988 | Calmettes et al. | 24/20 R |
| 4,858,279 A | * | 8/1989 | Kato et al. | 24/20 R |
| 4,882,814 A | * | 11/1989 | Takahashi | 24/20 R |
| 4,890,360 A | * | 1/1990 | Calmettes et al. | 24/20 R |
| 4,930,192 A | * | 6/1990 | Muhr | 24/20 R |
| 4,969,240 A | * | 11/1990 | Sauer | 24/20 R |

(Continued)

FOREIGN PATENT DOCUMENTS

EP   0 303 505 B1   2/1989

(Continued)

*Primary Examiner* — Terrell McKinnon
*Assistant Examiner* — Eret McNichols
(74) *Attorney, Agent, or Firm* — Sughrue Mion, PLLC

(57) ABSTRACT

Provided is an electrical wire fixing member that can be assembled in a simple manner with the reduced number of parts, and is capable of obtaining a sufficient lap amount, which can further reduce the number of parts. In an electrical wire fixing band 1 that secures an electrical wire 20, the first flange 3 is provided at a tip of the one end 2a of the body 2 in a shape of a ring, with both ends overlapping with each other along the circumference of the body. A second flange 4 is provided at the other end 2b. A protruding piece 5 is provided in a direction where the other end 2b becomes more distant from the one end 2a. A locking piece 6 is provided closer to the one end than the tip of the other end 2b is.

4 Claims, 6 Drawing Sheets

U.S. PATENT DOCUMENTS

| | | | | |
|---|---|---|---|---|
| 5,261,145 A * | 11/1993 | Jennings | | 24/20 R |
| 5,533,696 A * | 7/1996 | Laughlin et al. | | 248/74.2 |
| 5,596,790 A * | 1/1997 | Moller | | 24/20 EE |
| 5,706,557 A * | 1/1998 | Beicht | | 24/20 R |
| 5,921,520 A * | 7/1999 | Wisniewski | | 248/316.1 |
| 6,088,886 A * | 7/2000 | Gyongyosi | | 24/279 |
| 6,126,119 A * | 10/2000 | Giangrasso | | 248/58 |
| 6,343,772 B1 * | 2/2002 | Oi | | 248/75 |
| 6,473,943 B1 * | 11/2002 | Thacker | | 24/20 R |
| 6,568,043 B1 * | 5/2003 | Detable et al. | | 24/20 R |
| 6,598,269 B2 * | 7/2003 | Oetiker et al. | | 24/20 CW |
| D640,536 S * | 6/2011 | Larsen et al. | | D8/394 |
| 2003/0159255 A1 * | 8/2003 | Senovich et al. | | 24/20 R |
| 2003/0211780 A1 | 11/2003 | Simpson | | |
| 2005/0223526 A1 * | 10/2005 | Oetiker et al. | | 24/20 CW |
| 2009/0049656 A1 * | 2/2009 | Morita | | 24/20 R |

FOREIGN PATENT DOCUMENTS

| | | |
|---|---|---|
| EP | 0 926 419 A2 | 6/1999 |
| EP | 1 181 479 B1 | 8/2005 |
| JP | 56-67233 U | 6/1981 |
| JP | 5-73308 U | 10/1993 |
| JP | 11-037367 A | 2/1999 |
| JP | 2000-018459 A | 1/2000 |
| JP | 2004-510113 A | 4/2004 |
| JP | 2005-003086 A | 1/2005 |
| JP | 2005-030528 A | 2/2005 |
| JP | 2005-534141 A | 11/2005 |
| JP | 2006-010059 A | 1/2006 |
| WO | 03/096487 A1 | 11/2003 |
| WO | 2007/108155 A1 | 9/2007 |

* cited by examiner

ELECTRICAL WIRE FIXING MEMBER

TECHNICAL FIELD

The present invention relates to an electrical-wire fixing member configured to secure an electrical wire of a wiring harness to a housing member.

BACKGROUND ART

Referring to FIG. 11, there is shown a conventional structure that secures an intermediate portion of an electrical wire of a wiring harness to a body such as a connector housing to ensure that the stress that is caused when an electrical wire is pulled be not transferred to a caulking part or other relevant portions (see FIG. 11). The structure shown in FIG. 11 includes an electrical wire 101, a housing 102, a CS-ring 103, a stopper ring 104, and a telescopic tube 105.

Sheathed electrical wires 101a are covered by an outer insulating cover 101b to form the electrical wire 101, and a terminal fitting is attached to one end of the sheathed electrical wire for example by exposing its core wire to an outside. The housing 102 is formed by insulating synthetic resin approximately in a shape of a cylinder. The hole that passes through the housing 102 includes a large-diameter portion 102a and a small-diameter portion 102b that has a diameter smaller than that of the large-diameter portion 102a, to which the small-diameter portion 102b continues, with a step portion 102c defined at the boundary of the large-diameter portion 102a and the small-diameter portion 102b.

The CS-ring 103 is formed in a shape of a ring, and an inner diameter of the ring is larger than an outer diameter of the outer insulating cover 101b. Also, the CS-ring 103 has a plurality of protruding pieces 103a protruding radially inward of the ring. A diameter of an imaginary circle obtained by connecting tips of the protruding pieces 103a (i.e., "totsu-naikei", which means a convex inner diameter) is smaller than the outer diameter of the outer insulating cover 101b. The stopper ring 104 is formed in a shape of a ring, and an inner diameter of the ring is substantially identical with the outer diameter of the CS-ring 103 and an outer diameter of the ring is substantially identical with the large-diameter portion 102a of the housing 102. The telescopic tube 105 is attached to the outer surface of the outer insulating cover 101b.

The CS-ring 103 is attached to an inner diameter portion of the stopper ring 104 and is attached to the electrical wire 101. Thereafter, it is mounted inside of the housing 102 such that one side of the stopper ring 104 is in contact with the step portion 102c.

Also, a known strain relief for use in securing an electrical conduction cable to an electrical connector is disclosed in Patent Literature 1.

CITATION LIST

[Patent Literature] Japanese Patent Application Laid-Open Publication No. 2005-534141

SUMMARY OF INVENTION

Technical Problems

However, in the case of the known structure shown in FIG. 11, since the CS-ring 103 with the convex inner diameter smaller than the outer diameter of the outer insulating cover 101b has to be passed therethrough, operation has to be performed almost constantly under a condition of press-fit, making it difficult to perform assembling operation. Also, in consideration of simplified assembling operation, the dimensions of the protruding piece 103a of the CS-ring 103 and a lap amount are limited, making it impossible to ensure a sufficient level of the lap amount. Further, although it is possible to prevent movement in a direction indicated by an arrow A in FIG. 11, regulation in the opposite direction is not possible. In addition, since two parts, i.e., the CS-ring 103 and the stopper ring 104, are required for fixation, another drawback understandably is that the number of parts used is large.

Also, since the strain relief disclosed in Patent Document 1 is overmolded, there is a problem that disassembling operation is not easy to perform, which causes another problem that it is difficult to allow multiple times of mounting and detaching thereof.

Thus, in view of the above-identified problems, an object of the present invention is to provide an electrical wire fixing member that achieves simplified assembly operation, reduced number of parts, and the sufficient level of the lap amount, and thus achieves further reduction of the number of parts.

Solution to Problems

In order to solve the above-identified problems, provided is an electrical wire fixing member that passes an electrical wire therethrough and is mounted in a housing so as to secure the electrical wire in the housing. The electrical wire fixing member includes (a) a ring body formed in a shape of a ring and configured to be diameter-expanded and diameter-contracted by virtue of both ends of the ring body overlapping with each other along a circumference of the ring body, the both ends being configured to come close to and move away from each other, (b) a pair of flanges each protrudingly provided at edges of the both ends radially outward of the ring body, (c) a protruding piece protruding from the ring body radially outward of the ring body, the protruding piece being arranged in a direction where the one end of the both ends becomes more distant from the other end of the both ends circumferentially overlapping with the one end, and (d) a locking piece that protrudes from the other end and is configured to be locked with one of the flanges protrudingly provided at the edge of the one end when the ring body is diameter-contracted.

Preferably, the electrical wire fixing member may include a slit provided at the one end of the ring body and the other end enters the slit to intersect with the one end along the circumference of the ring body.

It is also preferred that the electrical wire fixing member includes a plurality of nails that are provided along the circumference of the ring body and protrude radially inward of the ring body. The nails are configured to secure the electrical wire.

Preferably, the electrical wire fixing member may include a fixation piece provided at an intermediate portion between the one end and the other end of the ring body and protrudes radially outward of the ring body. The fixation piece is configured to be secured to the housing.

Advantageous Effects of the Invention

According to the invention as has been described in the foregoing, assembling operation is facilitated because the electrical wire can be readily inserted into the ring body by expanding the inner diameter and the outer diameter of the ring body by virtue of the pair of flange displaced close to each other. Also, the electrical wire can be firmly secured by contracting the inner and outer diameters of the ring body by virtue of the protruding piece being displaced to be close to the flange protruding from the other end. Further, since the locking piece prevents the re-entry of the ring body into the unbiased state, so that the electrical wire is kept in a fixed state. In addition, since a state of fixation can be exited without difficulty, it is possible to perform the assembling operation as many times as it is required. Further, the electrical wire can be secured using only a single part.

Another advantageous effect is that retention of the ring-shaped state of the ring body is facilitated by virtue of the other end of the ring body entering the slit formed on the other end of the ring body to be placed orthogonal on the plane of the circumference.

In addition, by virtue of the plurality of nails, the electrical wire can be fixed more effectively and firmly, and thus sufficient amount of lap amount can be obtained.

Still another advantageous effect is that the secured electrical wire can be securely fixed inside of the housing regardless of the direction of the movement of the electrical wire.

REFERENCE SIGNS LIST

Figure 1:
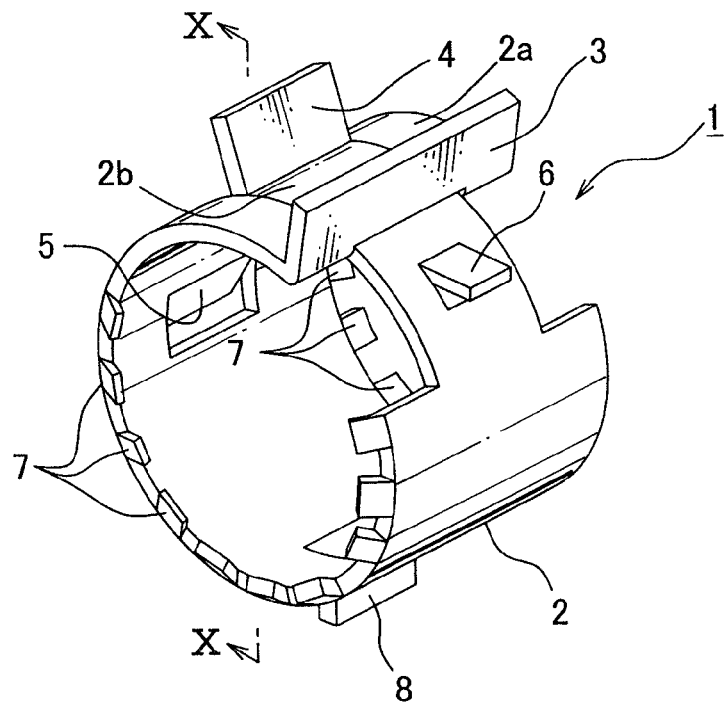
FIG. 1 is a perspective view of an electrical wire fixing band in a unbiased state according to one embodiment of the present invention.

1 Electrical wire fixing band (electrical wire fixing member)
2 Body (ring body)
2a One end
2b Other end
3 First flange (of a pair of flanges)
4 Second flange (of the pair of flanges)
5 Protruding piece
6 Locking piece
7 Nail
8 Fixation piece
9 Slit

DESCRIPTION OF EMBODIMENTS

Figure 2:
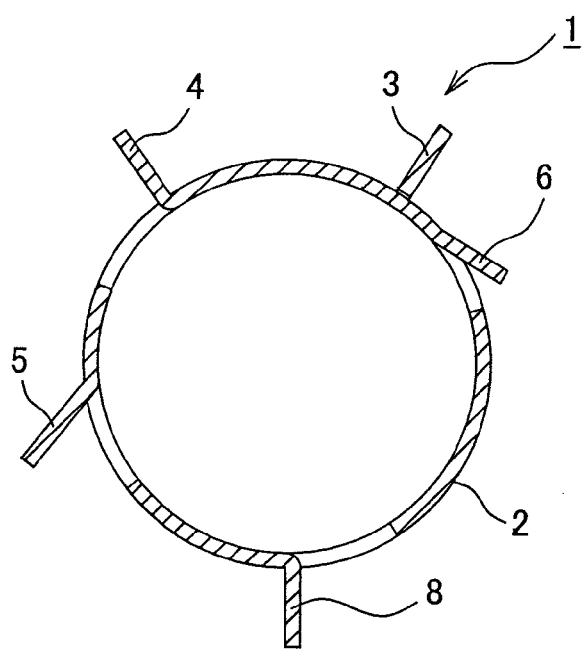
FIG. 2 is a cross-sectional view taken along the line XX in FIG. 1.
Figure 3:
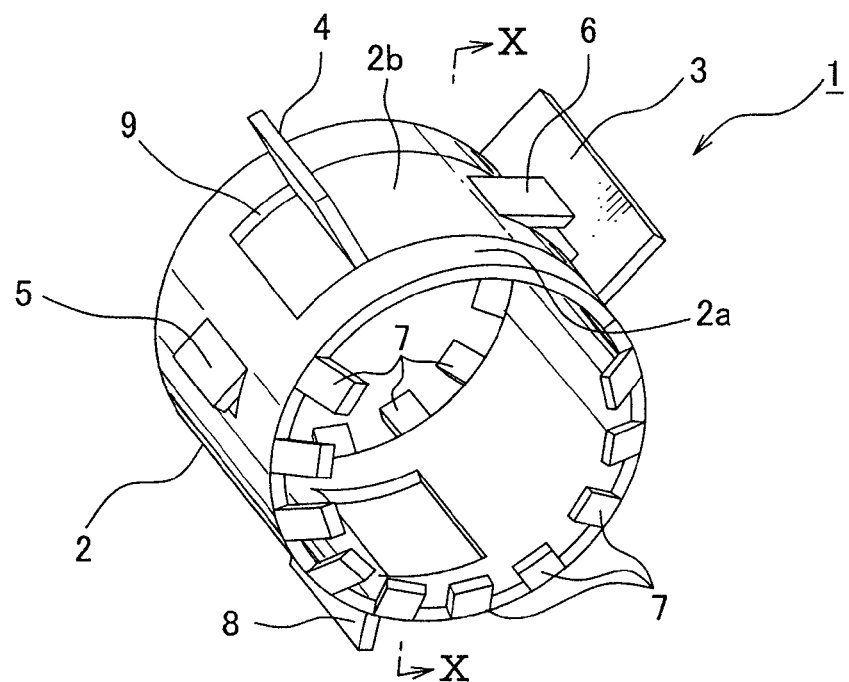
FIG. 3 is a perspective view of the electrical wire fixing band shown in FIG. 1, which is in an engaged state.
Figure 4:
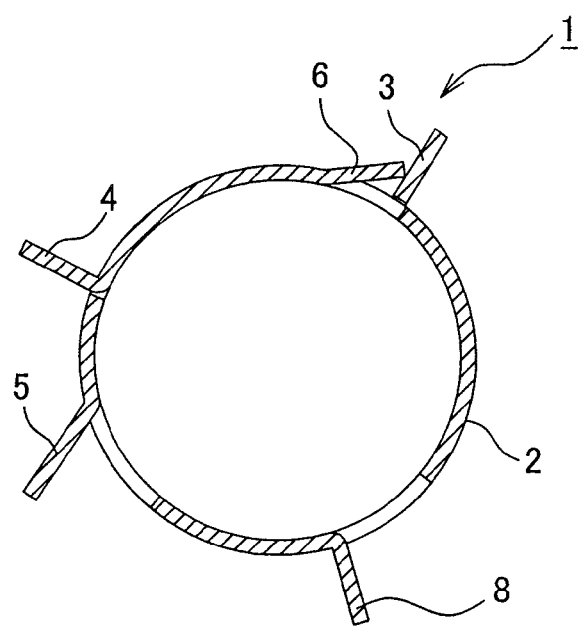
FIG. 4 is a cross-sectional view taken along the line XX in FIG. 3.

The following describes an electrical wire fixing band with reference to FIGS. 1 to 10, the electrical wire fixing band being an "electrical wire fixing member" according to one embodiment of the present invention. FIG. 1 is a perspective view of the electrical wire fixing band in an unbiased state. FIG. 2 is a cross-sectional view taken along the line XX in FIG. 1. FIG. 3 is a perspective view of the electrical wire fixing band shown in FIG. 1 placed in an engaged state. FIG. 4 is a cross-sectional view taken along the line XX in FIG. 3. The electrical wire fixing band 1 according to one embodiment of the present invention is, as shown in FIGS. 1 to 4, includes a body 2 provided with a first flange 3, a second flange 4, a protruding piece 5, a locking piece 6, a nail 7, and a fixation piece 8.

The body 2, which is a "ring body," is formed in a shape of a ring in any suitable manner such as by bending a strip-shaped sheet metal. Also, the body 2 has a diameter which becomes larger than that of an outer diameter of an electrical wire that is to be inserted therein when the ring is diameter-expanded (i.e., when the inner and outer diameters of the ring body are expanded), and also has a nail 7 (to be later described) whose dimensions is specified such that the nail 7 is not brought into contact with the electrical wire. Also, a width of the other end 2b of the body 2 is smaller than a width of one end 2a of the body 2. Further, the one end 2a of the body 2 has a slit 9 and is arranged such that the second flange 4 (to be later described) is inserted into the slit 9 to intersect with the slit 9 along a circumference of the body 2. Accordingly, the slit 9 has a width substantially identical with or slightly wider than the width of the other end 2a, and, further, the slit 9 has a length that allows the second flange 4 to be movable (displaceable) along the one end 2a such that the body 2 is diameter-contracted (i.e., when the inner and outer diameters of the body 2 is reduced) and finally the locking piece 6 is brought into engagement with the first flange 3. This means that the both ends of the body 2 intersect or overlap with each other along the circumferential surface of the body 2 to constitute a ring, and that the both ends are in contact with each other so that the inner and outer diameters of the body 2 can be expanded and contracted.

The first flange 3, which is one of "a pair of flanges," upstands from the one end 2a of the body 2 and radially outward of the body 2. The second flange 4, which is the other one of the pair of flanges, upstands from the other end 2b of the body 2 and radially outward of the body 2.

The protruding piece 5 is formed closer to the other end 2b than the slit 9 of the one end 2a of the body 2. This means that, in the unbiased state of the body (i.e., an initial state where the body 2 is not acted upon by an external force and is not elastically deformed), the protruding piece 5 is arranged in a direction where the first flange 3 becomes more distant from the second flange 4. Also, the protruding piece 5 protrudes from the circumferential surface of the body 2 and is bent raidally outward of the body 2 to be positioned close to the other end 2b of the body 2 (close to the central portion) in a shape of a substantially U-shaped notch.

The locking piece 6 is provided at the other end 2b of the body 2. Also, the locking piece 6 protrudes from the circumferential surface of the body 2 and is bent radially outward of the body 2 to be positioned close to the one end 2a of the body 2 in a shape of a substantially U-shaped notch. Also, as shown in FIGS. 1 and 2, the first flange 3 is found between the locking piece 6 and the second flange 4 in the unbiased state where the body 2 is not elastically deformed. Thus, as shown in FIGS. 3 and 4, when the body 2 is diameter-contracted to be placed in the engaged state (i.e., in a state where the electrical wire is held by the electrical wire fixing band), the locking piece 6 is brought into engagement with the first flange 3, and the second flange is displaced toward the first flange so that re-entry into the unbiased state is deterred.

The nails 7 are formed along the circumference of the body and at both sides of the body 2. Also, the nails 7 protrude radially inward of the body 2.

The fixation piece 8 is provided at an intermediate portion between the one end 2*a* and the other end 2*b* of the body 2. The term "intermediate portion" refers to, as shown in FIGS. 1 to 4, the fixation piece 8 preferably positioned in the neighborhood of the bottom side of the body 5 when the first and second flanges are positioned on the upper side circumferentially opposed to the bottom side. Also, the fixation piece 8 from the outer circumferential surface and is bent radially outward of the body 2 with substantially U-shaped notches formed in between, the fixation pieces 8 being formed close to the other end 2*b* of the body 2.

Next, the following describes how the electrical wire is secured using the electrical wire fixing band 1 with the above-described construction with reference to FIGS. 5 to 10.

Figure 5:
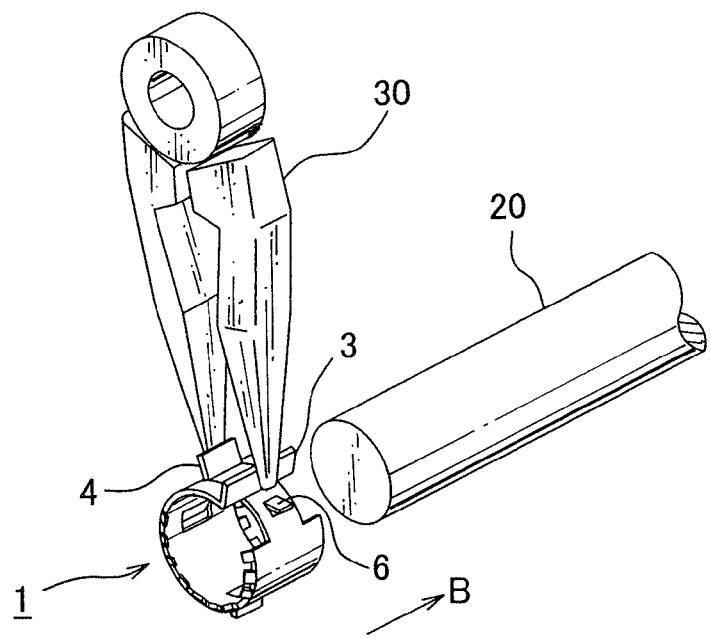
FIG. 5 is a perspective view of a mating connector shown in FIG. 1.

First, as shown in FIG. 5, the first flange 3 and the second flange 4 of the electrical wire fixing band 1 is held by a longnose pliers 30 so that the first flange 3 and the second flange 4 are in contact with each other. As a result, the body 2 is elastically deformed with the diameter thereof expanded. It should be noted that the longnose pliers 30 are not limited to the longnose pliers 30 but may be any tool that can clamp the first flange 3 and the second flange 4 together to be in contact with each other.

Figure 6:
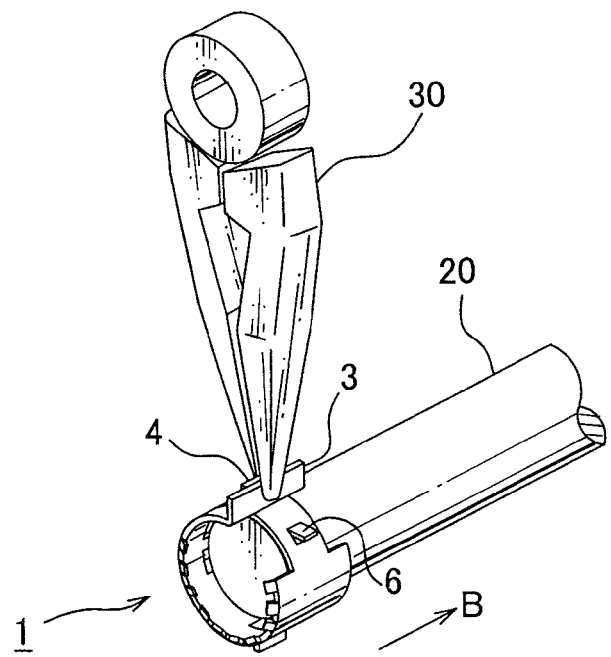
FIG. 6 is an explanatory illustration of how an electrical wire is secured using the electrical wire fixing band shown in FIG. 1.

Next, as shown in FIG. 6, the electrical wire 20 is inserted into the electrical wire fixing band 1 with the body 2 diameter-expanded. Since the diameter of the body 2 is expanded, the electrical-wire fixing band 1 is larger in its diameter than the outer diameter of the electrical wire 20, and thus the electrical wire is readily inserted into the electrical-wire fixing band 1. Here, the electrical wire 20 includes the plurality of sheathed electrical wires covered by the outer insulating cover, as in the case of a conventional electrical wire. Note that FIGS. 6 to 9 only indicate the outer surface of the electrical wire 20 covered by the outer insulating cover for the sake of simple illustration.

Figure 7:
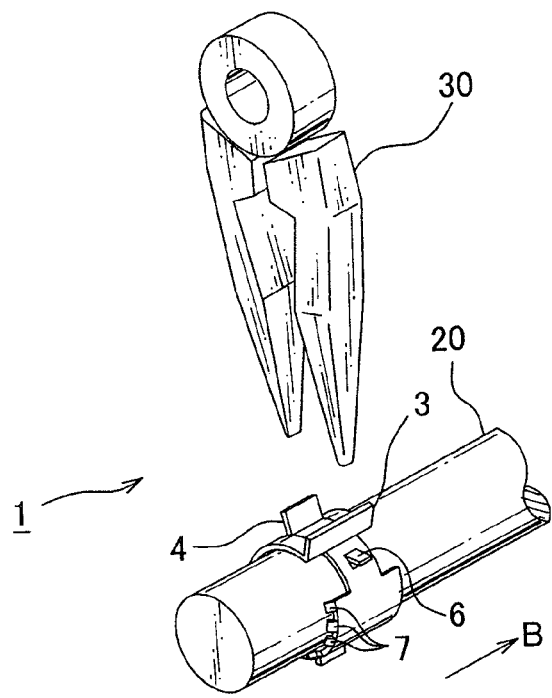
FIG. 7 is an explanatory illustration of how the electrical wire is secured using the electrical wire fixing band shown in FIG. 1.

Referring further to FIG. 7, at the point when the electrical wire fixing band 1 is located at a predetermined position of the electrical wire 20, the first and second flanges are detached from each other. Then the body 2 is elastically restored to be diameter-contracted and will return to the unbiased state. When the body 2 is elastically restored, the nail 7 bites slightly into the outer surface of the electrical wire 20 for provisional retention of the electrical wire.

Figure 8:
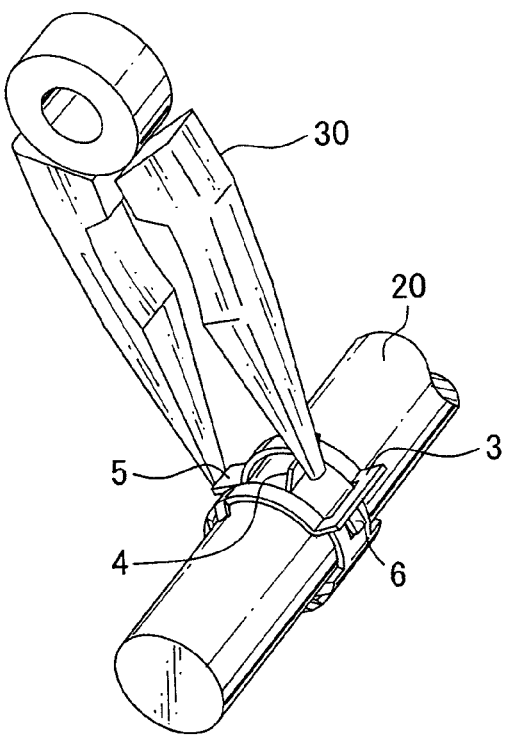
FIG. 8 is an explanatory illustration of how the electrical wire is secured using the electrical wire fixing band shown in FIG. 1.

Referring now to FIG. 8, the second flange 4 and the protruding piece 5 are held between the longnose pliers 30 so that the second flange 4 and the protruding piece 5 are displaced to be close to each other (that is, the first flange 3 and the second flange 4 become more distant from each other). As a result, the body 2 is elastically deformed to be diameter-contracted, and the locking piece 6 is pressed by a stem portion of the first flange 3, elastically deformed, and is displaced past the first flange 3.

Figure 9:
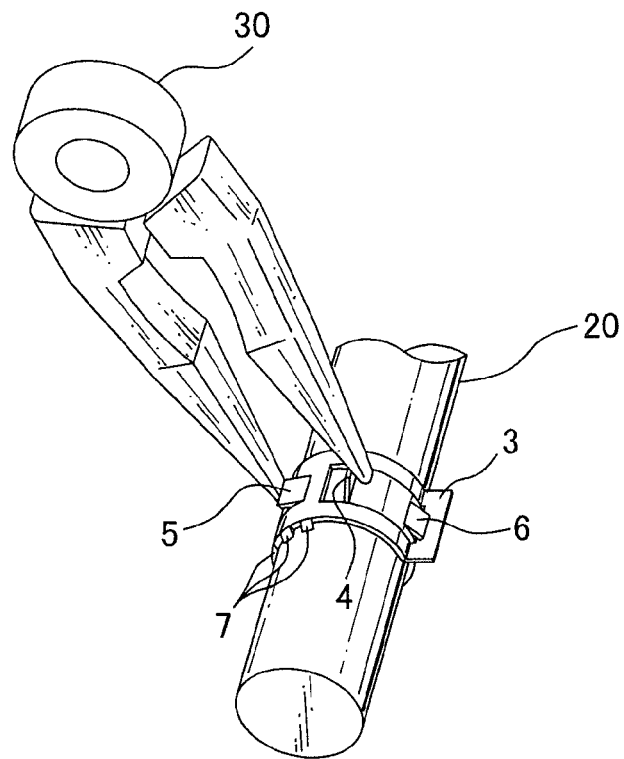
FIG. 9 is an explanatory illustration of how the electrical wire is secured using the electrical wire fixing band shown in FIG. 1.

Thus, as shown in FIG. 9, when the longnose pliers 30 are released at the point when the locking piece 6 has been completely displaced past the first flange 3, the tip of the locking piece 6 is placed in contact with the side surface of the first flange 3 so that re-entry of the body 2 into the unbiased state is prevented. At this point, the nails 7 bite into the electrical wire 20 deeper than in a state shown in FIG. 7, so that the electrical wire 20 is retained more firmly.

Figure 10:
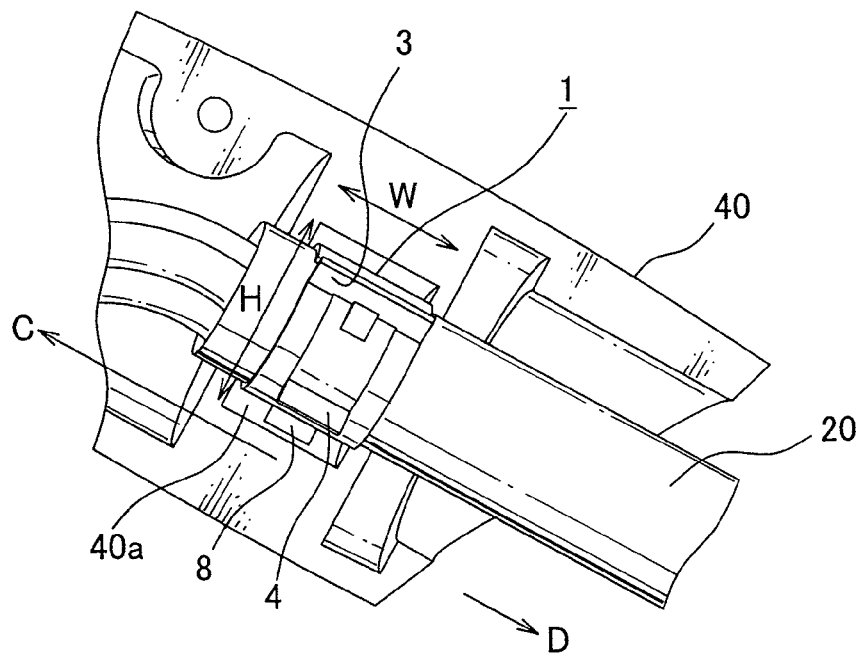
FIG. 10 is a partly cross-sectional view illustrating the engaged state of the electrical wire fixed inside of the connector housing using the electrical wire fixing band shown in FIG. 1.
Figure 11:
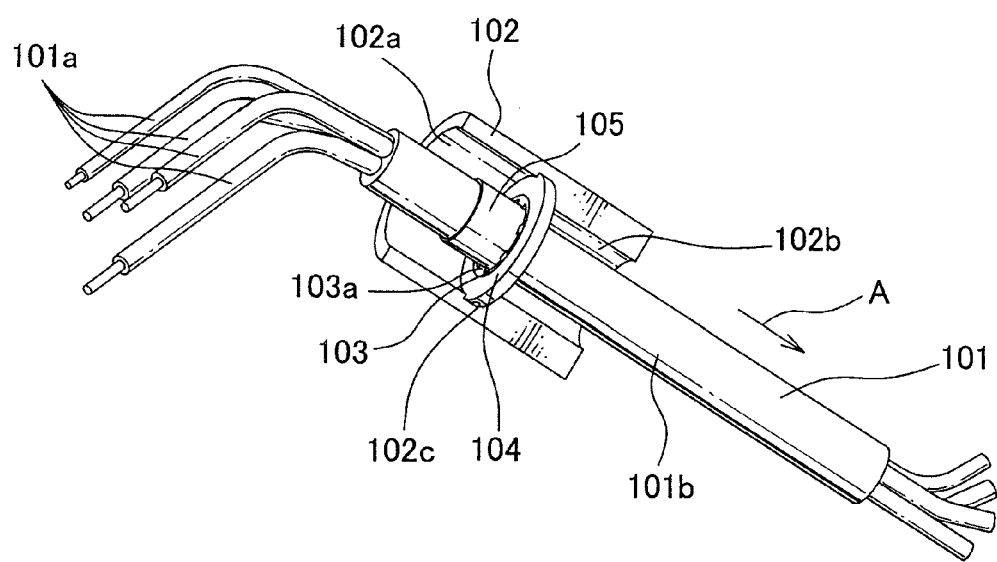
FIG. 11 is a partly cross-sectional view illustrating how a conventional electrical wire is clamped.

The electrical wire fixing band 1 that has been attached to the electrical wire 20 in the above-described direction, as shown in FIG. 10, is mounted to any suitable structure such as a mounting portion 40*a* inside of the connector housing 40 that connects the covered electrical wire within the electrical wire 20 to a corresponding part such as the terminal fitting. The mounting portion 40*a* wider in its width (W in FIG. 10) than the electrical wire fixing band 1 and is larger in its inner diameter (H in FIG. 10) than the circumference connecting the first flange 3, the second flange 4, and the fixation piece 8 of the electrical wire fixing band 1. Also, mounting portion 40*a* has a wall having a hole through which the electrical wire 20 can be passed widthwise of the electrical wire fixing band 1, and, accordingly, even when the electrical wire 20 is pulled in the directions indicated by arrows C and D shown in FIG. 10, the wall is brought into contact with the fixation piece 8, the first flange 3 and the second flange 4 so that the displacement is prevented.

In the electrical wire fixing band 1 that holds the electrical wire 20 according to the above-described embodiment, the first flange 3 is provided at the tip of the one end 2*a* of the ring-shaped body 2 with both ends overlapping with each other circumferentially. The second flange 4 is provided at the tip of the other end 2*b*. The protruding piece 5 is provided in a direction where the other end 2*b* becomes more distant from the one end 2*a*. The locking piece 6 is provided closer to the one end than the tip of the other end 2*b*. Accordingly, first, the body 2 can be diameter-expanded using the first flange 3 and the second flange 4, and thus the electrical wire 20 can be readily inserted into the body 2. Also, since the body 2 can be diameter-contracted using the second flange 4 and the protruding piece 5, the electrical wire fixing band 1 can be attached to the electrical wire 20. Also, by virtue of the locking piece 6, elastic deformation of the body 2 and re-entry of the body 2 into the unbiased state are effectively prevented and the engaged state is effectively maintained. Further, only one single part is required for fixing the electrical wire and holding the electrical wire inside of the housing, and thus the number of parts required can be reduced.

Also, since the slit 9 is formed at the one end 2*a* of the body 2 so that the other end 2*b* enters the slit 9 to be circumferentially in a state of intersection (or overlapping) with each other, the body 2 can be more securely held in the ring-shaped state.

Also, since the plurality of nails 7 are protrudingly provided along the circumference of the body 2 and radially inward of the body 2, the nails 7 bite into the outer surface of the electrical wire 20, so that the electrical wire 20 can be firmly secured. Also, through controlling the extent to which the nail 7 bites into the electrical wire 20 allows the holding power (lap amount) to be adjusted.

Also, since the fixation piece 8 is provided at the intermediate portion between the one end 2*a* and the other end 2*b*, displacement can be prevented irrespective of the direction where the electrical wire 20 within the connector housing 40 is pulled.

It should be noted that the present invention is described in, but not limited to, the above embodiment and, accordingly, that the present invention can be effectuated with various modifications within the spirit and scope of the present invention.

The invention claimed is:
1. An electrical wire fixing member mounted in a housing with an electrical wire passed therethrough so that the electrical wire is secured to the housing, and comprising:
 a ring body formed in a shape of a ring and configured to be diameter-expanded and diameter-contracted by virtue of both ends of the ring body overlapping with each other along a circumference of the ring body, the both ends being configured to come close to and move away from each other;

a pair of flanges each provided at edges of the both ends and extending radially outward of the ring body;

a protruding piece protruding from the one end of the ring body and extending radially outward of the ring body, the protruding piece being arranged in a direction where one end of the both ends becomes more distant from the other end of the both ends circumferentially overlapping with the one end;

an elastically deformable locking piece protruding front the other end and bent radially outward of the ring body and configured to be locked with one of the flanges protrudingly provided at the edge of the one end when the ring body is diameter-contracted; and a slit provided at the one end of the ring body, and the other end of the ring body and the locking piece fit in the slit to overlap with the one end along the circumference of the ring body such that an end of the locking piece abuts the flange of the other end of the ring body when the ring is in a diameter-contracted locked position.

2. The electrical wire fixing member as set forth ill claim 1, wherein a plurality of nails that secures the electrical wire are provided along the circumference of the ring body and protrude radially inward of the ring body.

3. The electrical wire fixing member as set forth in claim 1, wherein a fixation piece is provided at an intermediate portion between the one end and tile other end of the ring body and protrudes radially outward of the ring body, the fixation piece being configured to be secured to the housing.

4. The electrical fixing member as set forth in claim 1, wherein the locking piece elastically deforms when it is pressed by a stem portion of the one of the flanges until it is displaced past the one of the flanges, and once displaced past the one of the flanges, a tip of the locking piece contacts with a side surface of the one of the flanges to lock the locking piece with the one of the flanges.

* * * * *